Oct. 31, 1967  J. H. ELLIS  3,349,783
AUTOMATIC CAR WASH

Filed Sept. 13, 1965  6 Sheets-Sheet 1

INVENTOR.
John H. Ellis
BY
Harness, Dickey & Pierce
ATTORNEYS

Oct. 31, 1967　　　　　J. H. ELLIS　　　　　3,349,783
AUTOMATIC CAR WASH
Filed Sept. 13, 1965　　　　　　　　　　　6 Sheets-Sheet 5

INVENTOR.
John H. Ellis
BY
Harness, Dickey & Pierce
ATTORNEYS.

United States Patent Office 3,349,783
Patented Oct. 31, 1967

3,349,783
AUTOMATIC CAR WASH
John H. Ellis, 11676 E. Nine Mile Road,
Warren, Mich. 48091
Filed Sept. 13, 1965, Ser. No. 487,020
19 Claims. (Cl. 134—45)

ABSTRACT OF THE DISCLOSURE

A vehicle washing apparatus comprising a horizontally arranged overhead washing assembly and a pair of spaced vertically arranged side washing assemblies, each of the assemblies comprising nozzle means for directing washing fluid onto a vehicle; means including movable frame means and drive means on each of the assemblies for directing the nozzle means in a plurality of directions, and sensing means engageable with a vehicle moving through the apparatus for selectively actuating the drive means, whereby the nozzle means is continuously directed toward the adjacentmost portion of the vehicle to minimize the quantity of washing fluid required during a vehicle washing operation.

The purpose of the above abstract is to provide a nonlegal technical statement of the disclosure of the contents of the instant patent application and thus serve as a searching-scanning tool for scientists, engineers and researchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

---

This invention relates generally to washing devices, and particularly to an improved automatic vehicle washing device.

The washing devices to which the present invention relates include those adapted to wash a vehicle such as, for example, an automobile using high pressure water directed against the vehicle by selectively positioned nozzles as the vehicle moves through an enclosure housing the washing device. These devices may be manually operated but preferably are automatically energized to turn "on" as the vehicle enters the enclosure and turn "off" as is leaves.

It is desirable that the washing device effectively remove all dirt, grease, road film and other foreign matter from the vehicle surface so that as it emerges from the washing enclosure, the surface is completely clean and the vehicle is ready to be rinsed and dried without regard to further washing. In present day vehicle washing installations, the washing cycle is not fully automatic. Stated another way, it is necessary to use manpower with these devices to assist in washing some parts of the vehicle. Thus, hand-operated steam or water spray devices are used to loosen excessive dirt, grease, etc. from the vehicle tires, from the surface areas under and adjacent the front and rear bumpers and the lower vehicle side panel surfaces. In addition, the surface of these vehicles often requires hand-scrubbing to insure that all the dirt, etc. is loosened before rinsing.

In order to make these vehicle washing devices perform a fully automatic washing cycle and minimize the need for manpower assistance, it is necessary to increase substantially the water pressure supplied to the spary nozzles. However, simply to increase the water pressure and retain the existing nozzles in present day vehicle washing installations would require an extremely high pressure generator, the cost of which would not justify the manpower savings. On the other hand, if the number of nozzles were reduced to make available a higher nozzle pressure, all parts of the vehicle would not be reached by the nozzle spray. Thus, a fully automatic vehicle washing device minimizing the manpower need in vehicle washing installations and not requiring a prohibitively high cost pressure generator would be highly desirable.

Main objects of the present invention are a completely automatic vehicle washing device adapted to clean the entire vehicle surface and remove all dirt, grease, road film and other foreign matter therefrom while minimizing the need for manpower assistance, and one which utilizes a pressure generator of relatively low capacity and cost.

Further objects include a vehicle washing device of the above character which is controlled by vehicle movement to direct high pressure spray against the entire finished surface of the vehicle and which is adapted to turn "on" as the vehicle enters and turn "off" as it leaves.

Other objects include a fully automated vehicle washing device which is relatively inexpensive to manufacture, durable in construction and reliable in use.

Other objects and advantages of the present invention will become more apparent from a consideration of the following detailed description taken in conjunction with the drawings in which:

FIG. 4 is a fragmentary view of a portion of FIG. 2 incorporating a schematic illustration of another portion of a control circuit therefor;

Broadly described, the present invention includes a side nozzle assembly at either side of the path of movement of a vehicle adapted to swing through generally vertical paths and wherein each assembly is caused to pivot about a generally vertical axis in response to vehicle movement, and a center nozzle assembly positioned in the path of vehicle travel adapted to swing in a path generally transversely of said path of vehicle movement and to pivot about a horizontal axis transverse to said vehicle movement path in response to vehicle movement.

Figure 1:
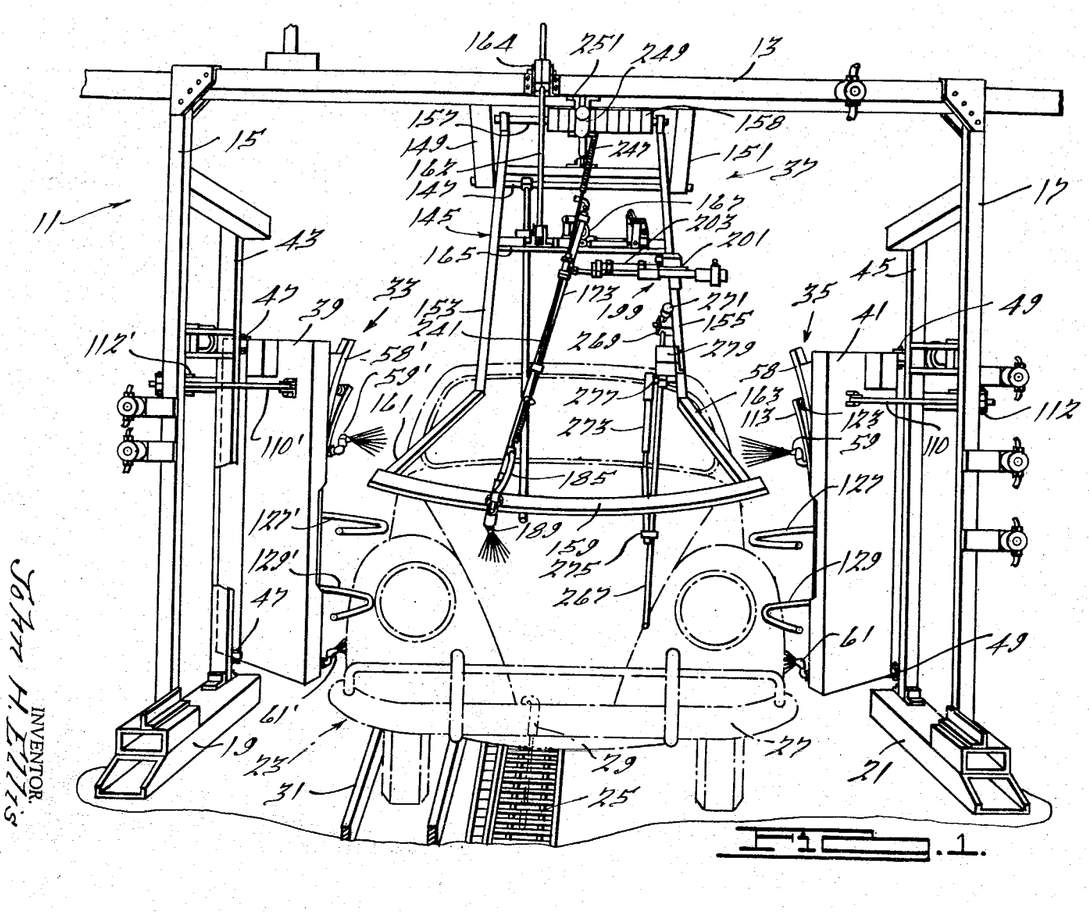
FIGURE 1 is a front elevational view of a vehicle washing device constructed according to the present invention and showing the device in operation.

Referring now more specifically to the drawings and especially FIG. 1, there is seen a generally rectangular framework 11 including a top frame 13 and a pair of side frames 15, 17, each secured to the top frame and to a base 19, 21, respectively. A vehicle to be washed is shown in dot-dash lines generally at 23 and is adapted to move through the frame work 11 between the side frames 15, 17. To this end, a longitudinally moving conveyor 25 may be secured to a bumper 27 or other frame member on the vehicle 23 by a removable strap 29. A guide channel 31 is positioned to guidingly receive the tires along one side of the vehicle to insure vehicle movement along a relatively straight path.

The washing device of the present invention includes a pair of side washing assemblies generally indicated at 33, 35 secured to the side frames 15, 17, respectively, and a center washing assembly generally shown at 37 secured to the top frame 13. Each of the side washing assemblies 33, 35 includes a gate 39, 41 pivotally mounted upon a subframe 43, 45 through hinges 47, 49, the subframes 43, 45 in turn being secured to the side frames 15, 17 and to the bases 19, 21, respectively. Except for being mounted in reverse fashion, the side washing assemblies 33, 35 are identical so that a detailed description of one will suffice here. In the drawings, numerals are used to illustrate the component parts of one side washing assembly while like numerals followed by a postscript (') illustrate corresponding parts of the other side washing assembly.

Figure 2:
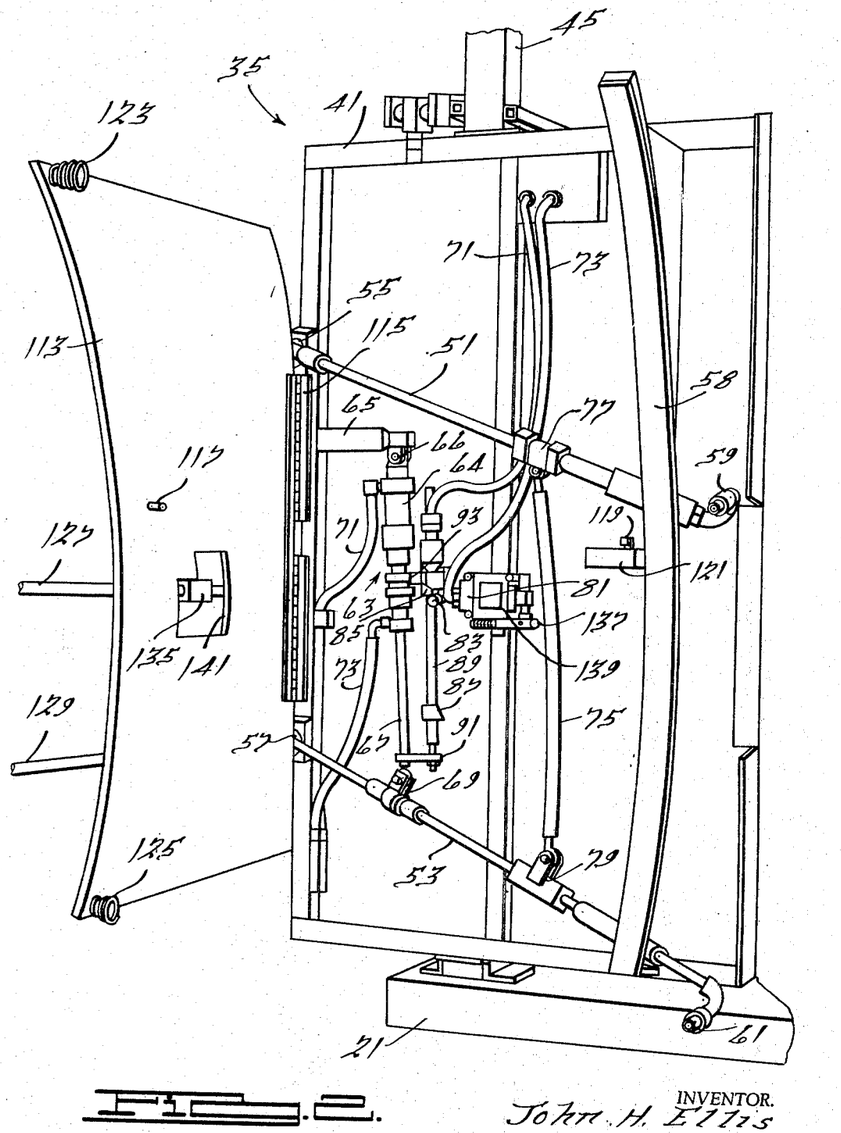
FIG. 2 is a perspective view with the parts opened for view illustrating one of the vehicle side washing assemblies.

Referring to FIG. 2, the gate 41 of the side washing assembly 35 has a spaced pair of pipes or tubes 51, 53 pivotally secured at one end thereof to the gate 41 through pivot means 55, 57, respectively. The other end of each of the pipes 51, 53 is slidably disposed in a generally concave cam track 58 secured to the gate 41. The pipes 51, 53 each has a nozzle 59, 61 secured to its end adjacent the cam track 58 and each of the pipes is connected by conduit means (not shown) to a high pressure generator (not shown). A fluid pressure motor 63 is provided for swinging the pipes 51, 53 about their pivot means 55, 57 and includes a cylinder 64 pivoted to an arm 65 by a pin 66, the arm 65 in turn secured to the gate 41. A piston is reciprocably mounted within the cylinder 64 and has a piston rod 67 pivotally secured to a bracket 69 fixed to the pipe 53. The cylinder 64 has conduits 71, 73 connected to its upper and lower ends, respectively, and adapted to supply fluid pressure from a source (not shown) above the piston and exhaust from below and vice versa so that by alternate control, the piston rod 67 is reciprocated vertically and the pipe 53 is pivoted on the gate 41. A connecting rod 75 is pivotally secured at opposite ends to brackets 77, 79 secured to the pipes 51, 53 and causes the pipe 51 to swing about its pivot 55 conjointly with pivotal movement of the pipe, 53, both pipes being guided by the cam track 58.

The directional flow of fluid to the motor cylinder 64 is controlled by a switch 81 having a control arm 83 pivoted thereto and electrically connected to a four-way directional valve 95 as shown schematically in FIG. 4. The control arm 83 is normally biased into engagement with a control rod 89 by a spring (not shown). The control rod 89 is fixed to the piston rod 67 by a bracket 91 and has an annular groove 85 adjacent one end and a cam block 87 secured near its other end. An upper bracket 93 secured to the cylinder 64 slidably receives and guides the control rod 89. Thus, as the piston rod 67 moves vertically upwardly, the control rod 89 moves therewith until the cam block 87 engages the switch control arm 83 and wedges it outwardly against the action of its biasing spring (not shown). This causes the valve 95 to shift and reverse the directional flow of fluid to the cylinder 64 and the directional travel of the piston rod 67 and control rod 89. Conversely, downward piston rod movement continues until the switch control arm 83 drops into the groove 85 of the control rod 89 whereupon the valve 95 returns to its original position causing the piston rod 67 to move upwardly. This alternate upward and downward travel of the piston rod 67 causes alternate pivotal movement of the pipes 51, 53 about the pivots 55, 57 so that high pressure water emitted from the nozzles 59, 61 sweeps over the entire vertical extent of the vehicle side surface. The cam track 58 preferably is concave as shown to direct the spray from the nozzle 59 slightly downwardly at the upper portion of its pivoted movement and to direct the spray from the nozzle 61 slightly upwardly at the lower portion of its pivotal movement. This insures that the roof edge and lower rocker panels are thoroughly sprayed and cleaned. Oftentimes, these areas, and especially the rocker panel area, have a severe buildup of dirt, grease, road film, etc. which is not removed during the washing cycle in conventional vehicle washing installations and requires additional washing thereafter. The present invention eliminates this condition by the controlled directional nozzle spray described above.

The side washing assembly 33 functions in an identical manner to the assembly 35 described so that a pair of nozzles 59', 61' swings vertically along the other side of the vehicle so that the spray emitted therefrom sweeps the entire vertical extent of the other side of the vehicle. Furthermore, since the vehicle is secured to the conveyor 25 by the strap 29, it moves past the side washing assemblies 33, 35 during this swinging or pivotal movement of the nozzles 59, 61 and 59', 61' with the result that both sides of the vehicle from top to bottom are subjected to the high pressure spraying action of the nozzles and are completely cleaned.

In addition to the vertical swinging or pivotal motion imparted to these side washing nozzles 59, 61 and 59', 61', an additional movement is imparted thereto to direct spraying action on a portion of the vehicle front end as it approaches and on a portion of the vehicle rear end as it leaves the washing device. This is to insure overlap of the spray action of these nozzles and that provided by the nozzle arrangement of the center washing assembly 37 to be described. To this end, the gates 39, 41 are pivoted about their hinges 47, 49, respectively, in response to movement of the vehicle 23. Thus, the gates face inwardly toward the vehicle front end as it approaches to cause the spray from the nozzles 59, 61 and 59', 61' to be directed against the outer front end areas and the gates pivot gradually as the vehicle passes so as to cause the nozzle spray to be directed against the vehicle sides and against the outer rear end areas of the vehicle.

Figures 2, 3:
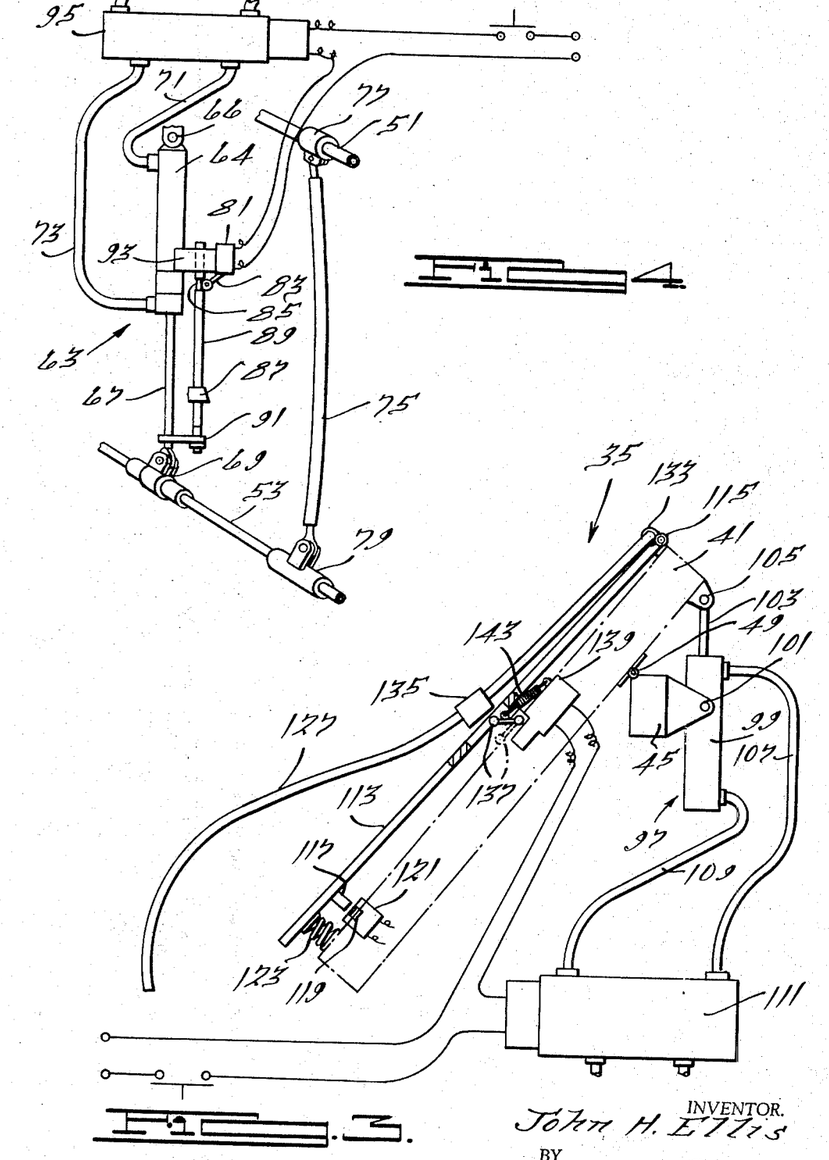
FIG. 3 is a top plan view of the structure of FIG. 2 shown with the parts in operational position and with a schematic illustration of a portion of a control circuit therefor.

Considering now FIGS. 2 and 3 and with reference to FIG. 1, a fluid pressure motor 97 including a cylinder 99 is pivotally secured to the subframe 45 by pivot means 101 (FIG. 3). A piston is slidable within the cylinder 99 and has a piston rod 103 pivotally secured to the gate 41 by a pivot means 105. A pair of fluid pressure conduits 107, 109 are connected to the cylinder 99 adjacent opposite ends thereof and are adapted to supply and exhaust pressure fluid from a pressure source (not shown) to opposite ends of the cylinder 99 in a manner described. A valve 111 is positioned between this pressure source (not shown) and the cylinder 99 to control the flow of pressure fluid to the motor 97. Thus, when flow of pressure fluid to the cylinder 99 is blocked, the piston rod 103 does not move and the gate 41 remains stationary. When pressure fluid is supplied to the cylinder 99 through conduit 109 and is exhausted through conduit 107, the piston rod 103 moves upwardly and swings the gate 41 counterclockwise about the hinges 49 as viewed in FIG. 3. Alternatively, when pressure fluid is supplied through conduit 107 and is exhausted through conduit 109, the piston rod 103 travels downwardly and the gate 41 swings in a clockwise direction about the hinges 49 as seen in the figure.

Considering now FIG. 1, it will be seen that when the gate 41 of side washing assembly 35 faces inwardly and rearwardly toward the oncoming vehicle 23, the spray from the nozzles 59, 61 is directed toward the front end of the vehicle 23 and against the outer front end area thereof adjacent thereto. The side washing assembly 33, being identical to the side washing assembly 35 but reversed in position, similarly directs spray against the outer front end area of the vehicle 23 opposite the first-mentioned one.

As the vehicle 23 continues moving through the washing device, the directional spray from the side washing assemblies 33, 35 changes so that it strikes substantially directly against the sides of the vehicle 23 and then against the outer rear end areas of the vehicle. To this end, the gates 39, 41 pivot or swing outwardly away from the path of the vehicle and toward the subframes 43, 45, respectively, in response to vehicle movement. Again, the structure for effecting pivotal movement of the gates 39, 41 is identical and a description of one is sufficient here.

Thus, panel 113 is pivotally secured to one vertical edge of the gate 41 by hinges 115. FIG. 3 illustrates the normal operational position for the panel 113 whereas in FIG. 2, the panel 113 has been swung away from the gate 41 to expose the parts for view. A pin 117 secured to the panel 113 is positioned to engage a switch arm 119 of a safety switch 121. A pair of compression springs 123, 125 secured to the panel 113 engages the cam track 58 and normally holds the pin 117 spaced from the switch arm 119.

A flexible wand assembly comprising parallel flexible arms 127, 129 and an interconnecting rod 130 are mounted on the panel 113 and are held in the position shown in FIG. 3 by a sleeve 133 surrounding the rod 130. The flexible arms 127, 129 are spaced outwardly from the panel 113 as shown and held there as by a light torsion spring (not shown) within the sleeve 133. The arms 127, 129 extend into the path of the vehicle 23 and are contacted thereby during vehicle movement through the washing device. The upper arm 127 is provided with a switch operating block 135 positioned to engage a pivotal control arm 137 of a switch 139 secured in the gate 41 when the arm 127 is flexed toward the panel 113. An opening 141 in the panel 113 is aligned with the switch control arm 137 and allows the block 135 to engage the switch control arm 137. A tension spring 143 is secured to the switch arm 137 and to the switch housing to normally hold the switch arm in the position shown in full lines in FIG. 3 in which position the switch 139 is open. When either of the arms 127, 129 is engaged by the oncoming vehicle 23, both arms are flexed as a result of the interconnecting rod 130 and move toward the panel 113 until the switch operating block 135 engages the switch control arm 137 and pivots it to the dot-dash position shown in FIG. 3 to close the switch 139. This effects a shifting in the valve 111 and causes fluid under pressure to be directed from the source (not shown) to one end of the cylinder 99 through the conduit 109 and exhausted from the other cylinder end through the conduit 107 back to the source. This causes the gate 41 to swing counterclockwise about hinges 49 as viewed in FIG. 3 and away from the path of the moving vehicle 23. Manifestly, movement of the gate 41 is more rapid than movement of the vehicle 23 so that the wand arms 127, 129 move back away from the vehicle. This allows the wand arms 127, 129 to assume their original position relative to the panel 113 and the switch 139 reopens under the force of spring 143 and pivotal movement of the gate 41 stops. A damper arm 110 is pivoted on the gate 41 and is slidable in a friction tube 112 mounted on the subframe 45 to dampen movement of the gate 41. Continued movement of the vehicle 23 again flexes the arms 127, 129 and closes the switch 139 whereupon the motor 97 is energized and pivots the gate 41 until the switch 139 again opens. This causes the panel 41 to pivot away from the moving vehicle 23 in step-by-step fashion and changes the attitude of the nozzles 59, 61 in the process. Thus, as the vehicle 23 moves adjacent the side washing assembly 33, the direction of spray from the nozzles 59, 61 shifts from the original direction which was rearwardly toward the front end of the oncoming vehicle to successive positions generally transverse to the path of vehicle movement and against the vehicle sides. When the panel 41 has been moved away from the vehicle 23 by the motor 97 to an extent sufficient to allow complete passage of the vehicle without further contact with the wand arms 127, 129, the spray direction from the nozzles 59, 61 is inclined slightly forwardly. This permits the spray to strike the rear portion of the vehicle sides and the outer area of the vehicle rear end as it passes. Similarly, the spray from the nozzles 59', 61' strikes the other side of the vehicle 23 and the other outer area of the vehicle rear end.

When the vehicle 23 has passed the side washing assemblies 33, 35, they are shut down either manually or, preferably, automatically by a device tripped by the moving vehicle. Simultaneously, the valve 111 is actuated to cause pressure fluid to flow in reverse fashion to that described above, i.e., from the source through the conduit 107 and exhausted through the conduit 109. This returns the gate 41 to its initial position in preparation for the next washing cycle. The gate 39 swings or pivots to its initial position in the same fashion and at the same time. The control circuit for the side washing assemblies 33, 35 may be turned "on" and "off" manually, such as, by a master switch. Alternatively, control for this circuit may be effected automatically, such as, for example, through electric eyes or wands engaged by the vehicle as it approaches the washing assembly and released when it leaves. Control devices of this type are well known in the art and are used in present-day vehicle washing installations and can be installed and programmed by the skilled workman. Therefore, for these reasons and since they form no part of this invention, they are neither illustrated nor described further here.

Each of the side washing assemblies 33, 35 has a safety switch such as that shown at 121 in FIGS. 2 and 3 for the assembly 33 to prevent the gates 39, 41 from damaging the oncoming vehicle should either of the switches 139, 139' fail to operate in the prescribed manner. Thus, the wand arms 127, 129, if moved too far toward the panel 113, are effective to move the panel 113 against the springs 123, 125 and cause the pin 117 to open the switch 121. This is easily made effective to shut down the entire device including the conveyor 25 so that the vehicle 23 is not damaged.

Turning now to the center washing assembly shown at 37 in FIG. 1 and in further detail in FIGS. 5–11, this assembly is seen to include a frame 145 pivotally secured at its upper end by a pivot bar 147 to a pair of arms 149, 151 secured to the top frame 13. The frame 145 includes a pair of side members 153, 155 interconnected at their ends by a rod 157. A plurality of counterweights 158 may be disposed on the rod 157. An arcuately shaped cam track 159 is secured to a pair of arms 161, 163 which in turn are fixed to the lower ends of the side members 153, 155. As shown in FIG. 1, the frame 145 is disposed directly in the path of vehicle movement and is adapted to swing or pivot upwardly about the bar 147 as the vehicle 23 moves therepast in a manner to be described. A damper arm 162 is pivoted on the frame 145 and is slidable in a friction tube 164 on the top frame 13 to dampen movement of the frame 145.

The frame 145 has a strut 165 interconnecting the side members 153, 155 at an intermediate point (FIGS. 1, 5–11). A housing 167 having a bearing 168 therein is secured to the strut 165 by bolts 169 and has a stub shaft 171 turnably supported therein. The forward end of the stub shaft 171 is welded or otherwise secured to a sleeve 172 slidable on a pipe 173 and supports it for swinging movement about the stub shaft axis. The lower end of the pipe 173 terminates in a plug 175 having a roller 177 engaging the cam track 159. Another roller 179 is disposed on the other side of the cam track 159 and is suspended from the plug 175 by a bracket 181 and a stub shaft 183 so that the swinging movement of the pipe 173 about stub shaft 171 is controllably guided by the rollers 177, 179 on the cam track 159.

The pipe 173 has a flexible conduit 185 secured thereto by a branch connection 187 located above the plug 175. As shown, the flexible conduit 185 is supported in a manner so that its end, which has a spray nozzle 189 connected thereto, is directed up under the cam track 159. To this end, a rod 191 has a screw 193 threaded in one end and secured to a portion of the branch connection 187. A band 195 encompassing the conduit 185 is secured to the other end of the rod 191. In addition, a generally U-shaped support 197 depends from the plug 175 below the roller 177 to limit downward movement of the end of the conduit 185 and the nozzle 189. The pipe 173 is adapted to be connected to the high pressure water source (not shown) so that high pressure water is supplied to the pipe 173 and is directed against the center area of the vehicle 23 by the nozzle 189 in a manner to be described.

The pipe 173 and therefore the nozzle 189 is adapted to swing back and forth about the axis of the stub shaft 171 and is guided by the cam track 159 to direct spray against the vehicle over its lateral surface. To this end, a fluid pressure motor 199 has a cylinder 201 which is secured to the frame side member 155 and has a piston slidable therein and connected to a piston rod 203. The piston rod 203 is universally secured to a bracket 205 on the pipe 173 and when reciprocated, causes the pipe 173 and the nozzle 189 to swing back and forth. A pair of conduits 207, 209 are connected to opposite ends of the motor cylinder 201 and are connected to a fluid pressure source (not shown). The direction of flow of pressure fluid to the motor 199 through the conduits 207, 209 is controlled by a valve (not shown) similar in all respects to the valve 95. In addition, this valve for the motor 199 is controlled by a switch 211 having a pivotal arm 213 thereon. This switch 211 is identical to the switch 81 and the arm 213 is movable when registered with a wedge block 215 and a groove (not shown) on a switch control rod 217. This block 215, groove and control rod 217 are identical to the block 87, groove 85 and control rod 89 and the rod 217 is secured to the piston rod 203 of the motor 199 for movement therewith. It will be appreciated then that the pipe 173 and nozzle 189 swing back and forth on the frame 145 in substantially the same fashion as the pipes 51, 53 and nozzles 59, 61 swing on the gate 41.

Figure 5:
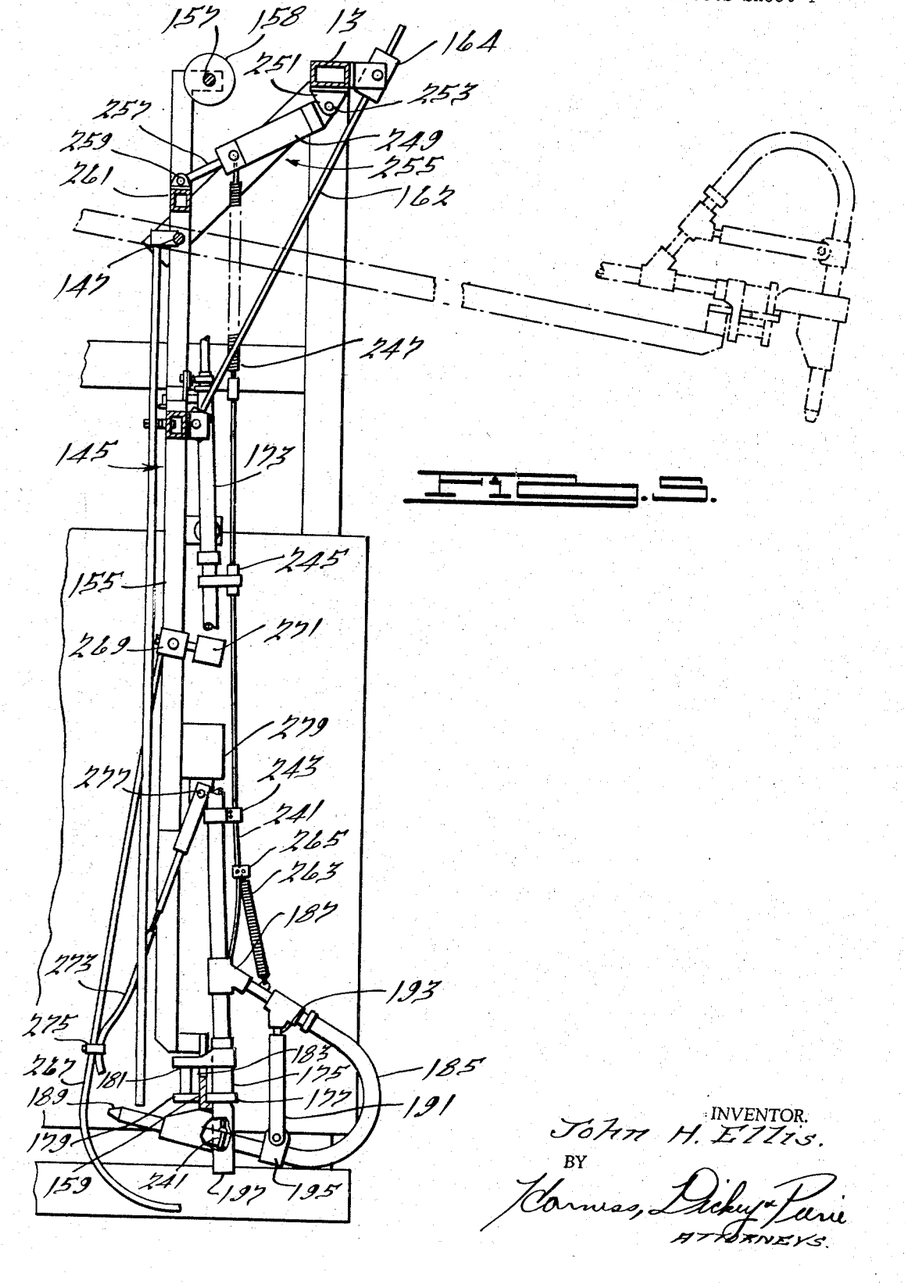
FIG. 5 is a side elevational view illustrating the washing mechanism for the front and top of the vehicle.
Figure 6:
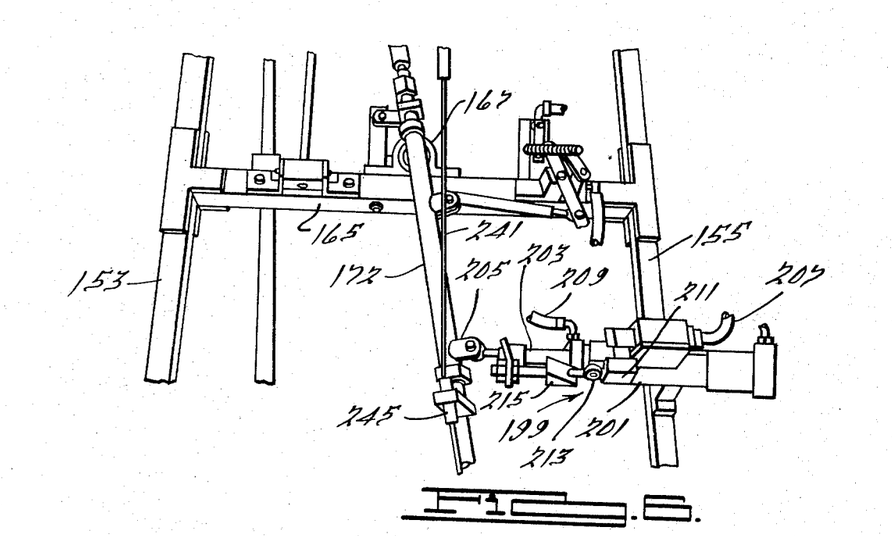
FIG. 6 is a fragmentary front elevational view of an upper portion of FIG. 5.
Figure 7:
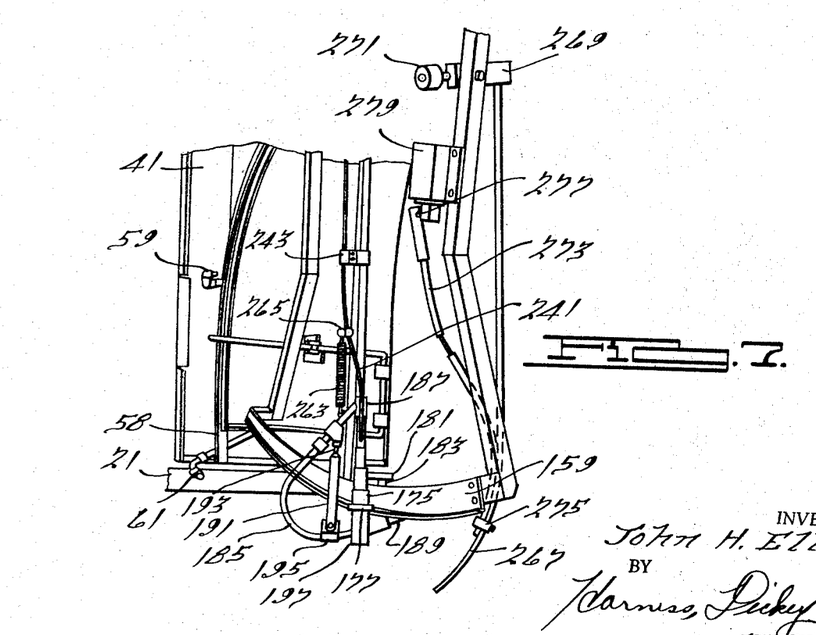
FIG. 7 is a fragmentary perspective view of a lower portion of FIG. 5 looking at the front thereof.
Figure 8:
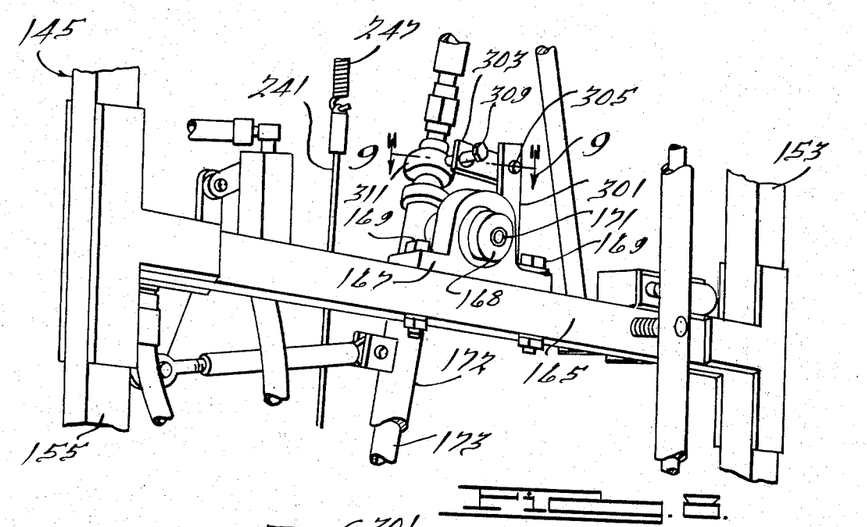
FIG. 8 is a fragmentary perspective view of the structure of FIG. 6 as seen from the rear thereof.

As the vehicle 23 approaches the washing assembly 37, the frame 145 is hanging in a nearly vertical position such as is shown in full lines in FIG. 5. The flexible conduit 185 is supported by the band 195 and rod 191 and by a cable 241 having its lower end extending through the pipe end 175 and secured to the conduit 185 adjacent the nozzle 189. The cable 241 extends upwardly along the pipe 173 being held by a pair of sleeves 243, 245 and has its upper end secured to one end of a tension spring 247. The other end of the spring 247 is conveniently secured to a cylinder 249 pivotally secured at one end to a bracket 251 mounted on the top frame 13 by a pivot pin 253. The cylinder 249 forms part of a fluid pressure motor 255 and has a piston slidable therein connected to a piston rod 257 pivotally secured by a pivot pin 259 to a lateral brace 261 interconnecting the side frame members 153, 155.

When the frame 145 is down or vertical as shown in FIG. 5, the spring 247 is under tension and pulls upwardly on the cable 241 to hold the nozzle 189 in the position illustrated. However, as the frame 145 swings upwardly about the rod 147, in a manner to be described, tension on the spring 247 relaxes allowing the conduit 185 and the nozzle 189 to drop downwardly relative to the frame 145 from the position shown in FIG. 5. To assist this action, a tension spring 263 is secured to the branch connection 187 and to a clamp 265 secured to the cable 241. This spring 263 is lighter than spring 247 and exerts a downward pull on the cable 241 and moves it downwardly only when tension on the spring 247 is relaxed.

As the vehicle 23 approaches the washing assembly 37, it is turned "on" either manually or automatically at the same time and preferably in the same manner as the side washing assemblies 33, 35. The frame 145 is vertical as shown in FIG. 5 and the spray from the nozzle 189 is directed slightly upwardly and along the bottom of the vehicle front end. The pipe 173 and nozzle 189 swing back and forth as the piston rod 203 reciprocates and the nozzle spray sweeps across the entire lateral width of the vehicle 23.

When the vehicle 23 nears the frame 145, the vehicle front end engages and moves a flexible wand 267 which energizes the fluid motor 255 and raises the frame 145 away from the vehicle 23. As shown in FIG. 5, the wand 267 is secured to a bracket 269 pivotally attached to the side frame member 155. A weight 271 is secured to the bracket 269 and normally maintains the bracket and wand 267 in the position shown in the figure. A switch actuating arm 273 is slidably interconnected to the wand 267 by a holder 275 and is secured to the operating shaft 277 of a switch 279.

The switch 279 is connected to a valve (not shown) adapted to control the direction flow of pressure fluid from a source (not shown) to the motor cylinder 249 to lift the frame 145 away from the oncoming vehicle 23 in substantially the same fashion as the motor 97 swings the gate 41 described above. The control valve (not shown) for the motor 255 is identical to the valve 111 for the motor 97 and a detailed description thereof is omitted here. Thus, when the vehicle front end engages the wand 267 and swings the switch actuating rod 273, the switch control shaft 277 is turned causing pressure fluid to flow to the motor 255 and swing the frame 145 upwardly or in a counterclockwise direction as seen in FIG. 5. Once the frame 145 has moved sufficiently so that the wand 267 can return to its original position along with the switch actuating rod 273, flow of pressure fluid to or from the motor cylinder 249 is blocked and the frame 145 is held in this semi-raised position, one such position shown in dot-dash lines in FIG. 5. This holds until the wand 267 is again contacted by the front end of the vehicle 23 whereupon the switch operating shaft 277 is again turned and the motor energized to raise the frame 145 further. This step-by-step frame raising continues with continued vehicle movement until the frame 145 is raised sufficiently to free the wand 267 from further contact with the vehicle 23. The frame 145 remains in this position until the flow of pressure fluid to the motor 255 is reversed whereupon the frame returns to its original vertical position. This is effected either manually or automatically by the same means and at the same time that the gates 39, 41 of the side washing assemblies 33, 35 return to their initial positions.

As the frame 145, is raised, tension on the spring 247 is relaxed and the nozzle 189 and conduit 185 move downwardly reversing its inclination relative to the frame 145. The effect of this is to change the attitude or angle at which the spray from the nozzle 189 is directed against the vehicle 23 during movement of the frame 145. Manifestly, the angle of spray is such as to be directed upwardly against the lower part of the vehicle front end when the frame 145 is vertical, substantially directly against the top surfaces of the vehicle 23 when it is adjacent this washing assembly and slightly forwardly of the vehicle 23 when spraying its rear end. This insures thorough cleaning of all the surfaces of the center portion of the vehicle, and particularly the undersections at the vehicle front end where dirt, grease, etc. tend to build up.

Figures 9, 10, 11:
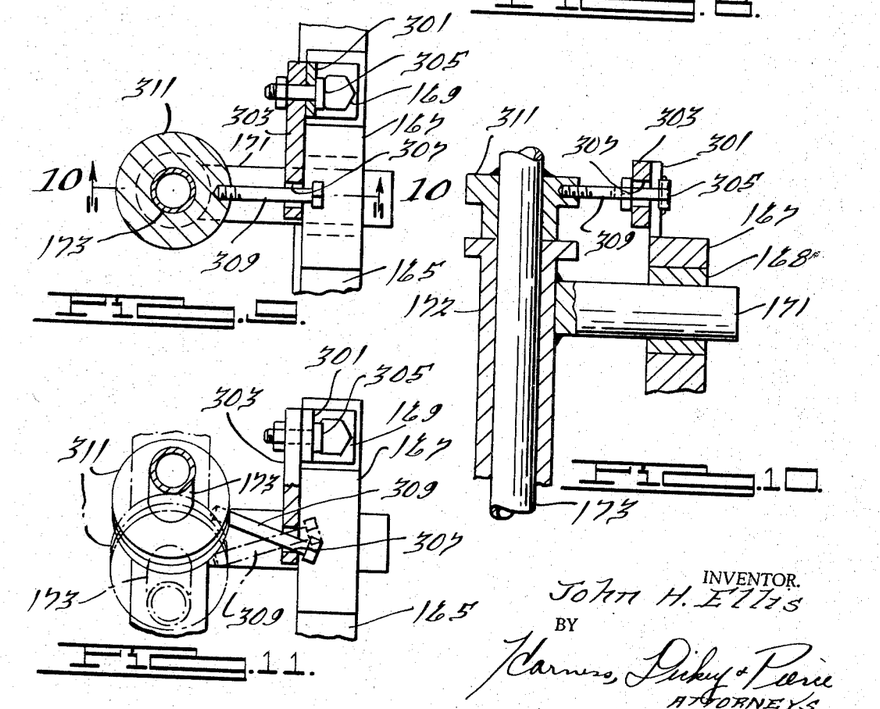
FIG. 9 is an enlarged sectional view of the structure of FIG. 8 taken along the line 9—9 thereof.
FIG. 10 is a sectional view of FIG. 9 taken along the lines 10—10 thereof.
FIG. 11 is a view similar to FIG. 9 showing the parts in their limits of movement.

In addition to the movement of the frame 145 and the pipe 173 described above, the pipe 173 and the nozzle 189 also are alternately turned about an axis substantially longitudinally of the pipe to direct the spray from the nozzle 189 more effectively against the vehicle surface. Thus, as shown in FIGS. 6 and 8–11, the bearing housing 167 has a generally L-shaped arm 301 secured thereto through one of the bolts 169. The arm 301 has a lateral extension 303 secured thereto at its upper end by a bolt means 305. The extension 303 has an enlarged opening 307 at its end spaced from the arm 301 and is adapted to loosely receive a screw 309 secured to a sleeve 311 welded or otherwise secured to the pipe 173. When the pipe 173 is swung back and forth about the stub shaft 171 by operation of the motor 199 and reciprocation of the piston rod 203, the pipe 173 is caused to turn substantially about its longitudinal axis by engagement between the screw 309 and the opening 307. Thus, the sleeve 311 and screw 309 swing relative to the fixed extension 303 during swinging movement of the pipe 173 since they are spaced from the axis of the stub shaft 171. The extent of this swinging movement is illustrated in FIG. 11 in full lines and in dot-dash lines. Manifestly, this turning movement of the pipe 173 about its longitudinal axis is such as to direct the spray from the nozzle 189 substantially directly against the vehicle surface when the pipe 173 is in a plane substantially longitudinally bisecting the vehicle 23, and inwardly against the outer ends of the vehicle 23 when the pipe 173 is swung to each lateral limit. This causes this spray to be effectively directed against the entire middle section of the vehicle 23 including the outer ends thereof. This action overlaps the spray from the nozzles of the side washing assemblies 33, 35 which are moved through concave generally vertical paths, to spray the vehicle sides from top to bottom and which spray the outer end areas of the vehicle front and rear ends.

Summarizing the operation of the washing device of the present invention, the vehicle 23 is moved by the conveyor 25 toward the washing device 11 which is turned "on" either manually or automatically by the approaching vehicle. This causes a high pressure spray to emerge from each of the nozzles 59, 61, 59', 61', 189 and be directed against the approaching vehicle. In addition, each of the nozzles is moved through its arcuate path of movement by its respective fluid motor. As the vehicle approaches the device 11, the spray from the nozzles of the side washing assemblies 33, 35 is directed against the outer end areas of the vehicle front end and overlaps the spray from the nozzle 189 which is directed at the underside of the vehicle front end. As described above, the nozzle 189 swings across the entire vehicle width and turns about the axis of the pipe 173 to effectively reach the entire vehicle front end. When the vehicle 23 engages the wands 127, 129, 127', 129' and 267, the gates 39, 41 swing outwardly toward the frames 15, 17 and the frame 145 swings upwardly until the wands are released from contact with the vehicle. This shifts the angle of the spray from the side washing assemblies 33, 35 so as now to be directed against the vehicle side surfaces. As the frame 145 is raised, the angle of the spray from nozzle 189 also is changed both by frame movement and by relaxing of the tension on the cable 241. This condition holds until the moving vehicle again engages the wands 127, 129, 127', 129' and 267 to again swing the panels 39, 41 and the frame 145 to again change the angle of spray from the nozzles which continue to swing as described above. This step-by-step position change of the nozzle spray direction continues until the wands no longer can contact the vehicle. Thereafter, the spray direction from the nozzles remains unchanged, the nozzle 189 being directed slightly forwardly of the vehicle 23 to reach the entire vehicle rear end and the nozzles of the side washing assemblies 33, 35 being inclined slightly forwardly to reach the outer portions of the vehicle rear end. When the vehicle 23 has completely passed the washing device 11, the device turns "off" either manually or automatically and each of the washing assemblies 33, 35 and 37 returns to its original position.

It has been discovered that the sweeping movement given the nozzles in the washing device of the present invention greatly reduces the required number of nozzles to effectively clean a vehicle. Thus, where up to several hundred nozzles were required in previously known vehicle washing devices, only five nozzles are now required to reach all parts of the vehicle surface. This permits a considerably higher water pressure than previously used in prior installations to be attained at each of the nozzles without increasing the size of the required pressure generator to any great extent. As set forth above, it is advantageous to have a higher water pressure at the nozzles, since this feature makes the washing device fully automatic and eliminates the need for manpower assistance to carry out the washing cycle. However, until the present invention, the cost of the needed pressure generator to achieve this did not justify its use. This prohibitive cost problem is eliminated by the present invention and the advantages of a high pressure system are achieved.

By the present invention, there is provided an effectively high pressure vehicle washing device calculated to fulfill the objects and advantages set forth and while a preferred embodiment has been illustrated and described in detail above, various additions, substitutions, modifications and omissions may be made thereto without departing from the spirit of the invention as encompassed by the appended claims.

What is claimed is:

1. A vehicle washing device including a pair of gates pivotal about vertical axes, one at either side of the path of travel of a vehicle therethrough, at least one nozzle mounted on each said gate for generally vertical swinging movement relative thereto, said gates being pivotable on their respective axes in response to vehicle movement to change the attitude of spray from said nozzles as said vehicle moves through said washing device, a frame pivotal about a generally horizontal axis normal to said path of vehicle travel, a nozzle mounted on said frame for swinging movement in a path generally transverse to the path of vehicle movement, said nozzle being secured to the end of a conduit pivotally mounted on said frame, said frame being pivotable on its axis in response to vehicle movement to change the attitude of spray from said last-mentioned nozzle, and means for moving said last-mentioned nozzle along an arcuate path related generally to the conformation of the vehicle.

2. A vehicle washing device including a pair of gates pivotal about vertical axes, one at either side of the path of travel of a vehicle therethrough, at least one nozzle mounted on each said gate for generally vertical swinging movement relative thereto, said gates being pivotable on their respective axes in response to vehicle movement to change the attitude of spray from said nozzles as said vehicle moves through said washing device, a frame pivotal about a generally horizontal axis normal to said path of vehicle travel, a nozzle mounted on said frame for swinging movement in a path generally transverse to the path of vehicle movement, switch means on said frame being engageable by said vehicle and adapted to cause said frame to pivot about its axis in response to vehicle movement to change the attitude of spray from said last-mentioned nozzle, and means for moving said last-mentioned nozzle along an arcuate path related generally to the conformation of the vehicle.

3. A vehicle washing device including a pair of gates pivotal about vertical axes, one at either side of the path of travel of a vehicle therethrough, hydraulic means for pivoting said gates, a pair of nozzles mounted on each said gate for generally vertical swinging movement relative thereto, switch means on each said gate engageable with said vehicle and adapted to energize said hydraulic means and pivot said gates away from said vehicle, a frame pivotal about a generally horizontal axis normal to said path of vehicle travel, hydraulic means for pivoting said frame, a nozzle mounted on said frame for swinging movement in a path generally transverse to said path of vehicle travel, switch means on said frame engageable with said vehicle and adapted to energize said last-mentioned hydraulic means and pivot said frame away from said vehicle.

4. A vehicle washing device including a pair of gates pivotal about vertical axes, one at either side of the path of travel of a vehicle therethrough, hydraulic means for pivoting said gates, a pair of nozzles mounted on each said gate for generally vertical swinging movement relative thereto, normally open switch means on each said gate engageable with said vehicle and adapted to energize said hydraulic means and pivot said gates away from said vehicle, a frame pivotal about a generally horizontal axis normal to said path of vehicle travel, hydraulic means for pivoting said frame, a nozzle mounted on said frame for swinging movement in a path generally transverse to said path of vehicle travel, normally open switch means on said frame engageable with said vehicle and adapted to energize said last-mentioned hydraulic means and pivot said frame away from said vehicle.

5. In a vehicle cleaning apparatus, means defining a path along which a vehicle may travel as it is being cleaned, at least one nozzle adapted to discharge a cleaning fluid toward a vehicle moving along the path, means operatively supporting said nozzle for movement in a first direction about an axis extending generally parallel to the path and in a second direction about an axis extending generally transversely to the path, means engageable with the vehicle traveling along the path for controlling the movement of said support means in at least one of said directions, and means for moving said nozzle along an arcuate path related generally to the conformation of the vehicle, said means operatively supporting said nozzle comprising frame means pivotal about an axis and including means for supporting said nozzle for swinging movement along a path generally transverse to the path which the vehicle travels as it is being cleaned.

6. The invention as set forth in claim 5 which includes drive means for pivoting said frame means relative to said path, and which includes switch means for selectively actuating said drive means upon engagement of the vehicle therewith.

7. The invention as set forth in claim 5 which includes a pair of side nozzle assemblies and means responsive to movement of the vehicle along the path to bias said nozzle assemblies about a generally vertical axis.

8. The invention as set forth in claim 5 which includes a pair of gates pivotal about vertical axes, disposed one at each side of the path of vehicle travel, a pair of nozzles mounted on each of said gates for generally vertical swinging movement relative thereto, and means for moving said nozzles relative to said gates in response to vehicle movement along the path.

9. The invention as set forth in claim 5 which includes a pair of gates pivotal about vertical axes, one at either side of the path of travel of a vehicle therethrough, a pair of nozzles disposed on each said gate for generally vertical swinging movement relative thereto, each of said nozzles being secured to the end of a conduit pivotally mounted on its respective gate, said gates being pivotable on their respective axes in response to vehicle movement to change the attitude of spray from said nozzles as said vehicle moves along the path.

10. The invention as set forth in claim 5 which includes a pair of side nozzle assemblies adapted to swing through generally vertical paths, a center nozzle assembly adapted to swing in a path generally transverse to the path of vehicle movement, and means responsive to vehicle movement along the path to bias said center nozzle assembly about a generally horizontal axis normal to the path of vehicle movement.

11. The invention as set forth in claim 5 which includes a pair of gates pivotal about vertical axes, one at either side of the path of travel of a vehicle therethrough, at least one nozzle mounted on each said gate for generally vertical swinging movement relative thereto, said gates being pivotable on their respective axis in response to vehicle movement to change the attitude of spray from said nozzles as said vehicle moves through said washing device, a frame pivotal about a generally horizontal axis normal to said path of vehicle travel, and a nozzle mounted on said frame for swinging movement in a path generally transverse to the path of vehicle movement, said frame being pivotable on its axis in response to vehicle movement to change the attitude of spray from said last mentioned nozzle.

12. The invention as set forth in claim 5 which includes frame means for operatively supporting said nozzle, and which further includes hydraulic means on said frame means for selectively moving said nozzle.

13. The invention as set forth in claim 5 which includes a pair of gates pivotal about vertical axes, one at either side of the path of travel of a vehicle therethrough, at least one nozzle mounted on each said gate for generally vertical swinging movement relative thereto, said gates being pivotable on their respective axes in response to vehicle movement to change the attitude of spray from said nozzles as said vehicle moves through said washing device, and a frame pivotal about a generally horizontal axis normal to said path of vehicle travel, a nozzle mounted on said frame for swinging movement in a path generally transverse to the path of vehicle movement, said nozzle being secured to the end of a conduit pivotally mounted on said frame, hydraulic means on said frame for pivoting said conduit and swinging said last mentioned nozzle, said frame being pivotable on its axis in response to vehicle movement to change the attitude of spray from said last mentioned nozzle.

14. The invention as set forth in claim 5 wherein said means for moving said nozzles along an arcuate path comprises a cam track mounted on said means for operatively supporting said nozzle.

15. In a vehicle cleaning apparatus, a fixed support structure, nozzle means for discharging a cleaning fluid toward the vehicle to be cleaned, frame means operatively supporting said nozzle means for pivotal movement relative to said support structure, drive means for pivoting said frame means and said nozzle means relative to said support structure, position sensing means engageable with a vehicle traveling along a path adjacent said structure, said sensing means being movable between an open and a closed position relative to said frame means, first switch means for actuating said drive means and thereby moving said frame means relative to said sensing means when said sensing means is biased to said closed position, and second switch means for deactuating said drive means when said frame means has been moved relative to said sensing means such that sensing means is in said open position with respect to said frame means, whereby said frame means and nozzle means will be incrementally moved relative to a vehicle as the same travels along said path.

16. The invention as set forth in claim 15 wherein said position sensing means is carried on said frame means.

17. The invention as set forth in claim 15 wherein said first and second switch means comprise a single switching device actuatable in response to preselected movement of said position sensing means.

18. The invention as set forth in claim 15 wherein said nozzle is movable relative to said frame means.

19. The invention as set forth in claim 15 wherein said support structure includes means for supporting said frame means for switching movement about a generally horizontal axis.

References Cited

UNITED STATES PATENTS

| | | |
|---|---|---|
| 2,321,983 | 6/1943 | Brackett. |
| 3,196,888 | 7/1965 | Rousseau ___________ 134—45 |
| 3,251,084 | 5/1966 | Larson et al. |
| 3,288,109 | 11/1966 | Smith et al. ______ 134—123 X |

CHARLES A. WILLMUTH, *Primary Examiner.*

R. L. BLEUTGE, *Examiner.*